United States Patent
McGuffin et al.

(10) Patent No.: US 7,684,820 B2
(45) Date of Patent: Mar. 23, 2010

(54) SYSTEM AND METHOD FOR SELECTING A GROUND STATION IN AN AIR-GROUND DATA NETWORK

(75) Inventors: Thomas F. McGuffin, Seattle, WA (US); Willard R. True, Kirkland, WA (US); Michael D. Holder, Redmond, WA (US); Mark C. Erwin, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 1005 days.

(21) Appl. No.: 10/907,227

(22) Filed: Mar. 24, 2005

(65) Prior Publication Data

US 2006/0217851 A1   Sep. 28, 2006

(51) Int. Cl.
*H04Q 7/20* (2006.01)
(52) U.S. Cl. .................. 455/525; 455/56.1; 455/62; 455/431
(58) Field of Classification Search .................. 455/525
See application file for complete search history.

(56) References Cited

U.S. PATENT DOCUMENTS

| | | | | | |
|---|---|---|---|---|---|
| 3,659,085 | A | * | 4/1972 | Potter et al. | 701/207 |
| 4,687,013 | A | * | 8/1987 | Stevenson | 137/7 |
| 5,249,303 | A | * | 9/1993 | Goeken | 455/431 |
| 6,430,412 | B1 | * | 8/2002 | Hogg et al. | 455/436 |
| 6,760,778 | B1 | * | 7/2004 | Nelson et al. | 455/431 |
| 7,194,523 | B2 | * | 3/2007 | Nelson et al. | 709/218 |
| 2002/0004401 | A1 | * | 1/2002 | Heppe et al. | 455/456 |

\* cited by examiner

*Primary Examiner*—Yuwen Pan
*Assistant Examiner*—Ajibola Akinyemi
(74) *Attorney, Agent, or Firm*—Fogg & Powers LLC

(57) ABSTRACT

Systems and methods for selecting a ground station for air-ground communications are disclosed. In an embodiment, a system includes a communications device operable to maintain bi-directional communications between an aircraft and a selected ground station, and a communications processor coupled to the device that is configured to select the ground station by executing a logical rule that is based upon a signal strength value of the ground station and at least one of an aircraft altitude and an occupancy value of the frequency channel.

7 Claims, 4 Drawing Sheets

SYSTEM AND METHOD FOR SELECTING A GROUND STATION IN AN AIR-GROUND DATA NETWORK

BACKGROUND OF THE INVENTION

Information is typically communicated between a ground station and an aircraft using a VHF communications apparatus that operates in a frequency band allocated to aircraft operation. For example, voice communications between aircraft and ground-based air traffic control facilities are generally carried out by means of a VHF communications transceiver that operates in a frequency band from 118.0 MHz to 135.95 MHz on any of a plurality of selectable and discrete channel frequencies in this band. Data may also be communicated between a ground station and an aircraft by coupling a modem to the VHF communications transceiver so that data may be communicated using audio frequency tones. For example, the well-known Aircraft Communications Addressing and Reporting System (ACARS) and the Aeronautical Telecommunications Network (ATN) provide a data link capability so that character-oriented and bit-oriented communications may occur between the ground station and the aircraft.

Since radio communications at VHF frequencies is generally limited to line of sight propagation, communications between the ground station and the aircraft are generally not possible after the aircraft has flown beyond the horizon. If intervening geographical obstructions, such as a mountain range, are present between the ground station and the aircraft, communications may not be possible even though the aircraft has not yet flown beyond the horizon. In order to maintain continuous communications between a ground station and an aircraft, a plurality of intervening ground stations are generally required to relay signals between a central station originating the communications and the aircraft as it proceeds along a given flight route. Accordingly, in a circuit-switched radio system, a connection is created between the originating ground station and the aircraft through one or more relay stations by dedicating a predetermined amount of transmission capacity to the connection. Alternately, in a packet-switched system (such as ACARS or ATN), a connection is created between the originating station and the aircraft by transmitting data in packets having address and control data encoded on discrete portions of the communication. As a result, several connections may use the same transmission path simultaneously, since the path is dedicated to a single connection only for the packet transmission.

In either case, a communications path from the ground station to the aircraft must be selected and enabled. Signal routing may be based upon prior calculation, or upon operational experience obtained from aircraft that regularly navigate along a selected route. For example, when selecting a ground station, logic associated with the communications system in the aircraft may be configured so that the communications system operates as if the system is positioned at or above a reference altitude (typically about twenty-five thousand feet) even though the aircraft may be positioned at an altitude that is below the reference altitude. While this assumption generally permits the selection of an appropriate ground station in most instances, when the aircraft is operated at an altitude that is significantly below the reference altitude, such as on the ground, in a holding pattern or in the approach structure, communication difficulties may arise. Thus, the "hand-over" point, which is a location where the aircraft ceases communicating with one ground station, and initiates communications with another, may not be reliably determined in communication systems so configured.

In other known communications systems, the logic associated with the system is configured to minimize the number of ground stations selected as the aircraft navigates along a route, since the overall cost of air-ground communications is at least in part determined by the number of ground station hand-overs that occur along the route. This approach is nevertheless subject to certain operational disadvantages. For example, the system may continue communicating with a selected ground station even though there are ground stations that are positioned closer to the aircraft, which may provide relatively higher signal strengths, and therefore provide more reliable communications between the aircraft and the ground station.

What is needed is a communications system that is dynamically configurable so that ground station selection is not dependent upon a fixed aircraft altitude or upon the minimization of station hand-overs.

SUMMARY OF THE INVENTION

The present invention relates generally to systems and methods for selecting a ground station for air-ground communications. In one aspect, a system includes a communications device operable to maintain bi-directional communications between an aircraft and a selected ground station, and a communications processor coupled to the device that is configured to select the ground station by executing a logical rule that is based upon a signal strength value of the ground station and at least one of an aircraft altitude and an occupancy value of the channel.

BRIEF DESCRIPTION OF THE DRAWINGS

The preferred and alternative embodiments of the present invention are described in detail below with reference to the following drawings.

DETAILED DESCRIPTION OF THE INVENTION

Many specific details of certain embodiments of the invention are set forth in the following description and in FIGS. 1 through 4 to provide a thorough understanding of such embodiments. One skilled in the art, however, will understand that the present invention may have additional embodiments, or that the present invention may be practiced without several of the details described in the following description.

Figure 1:
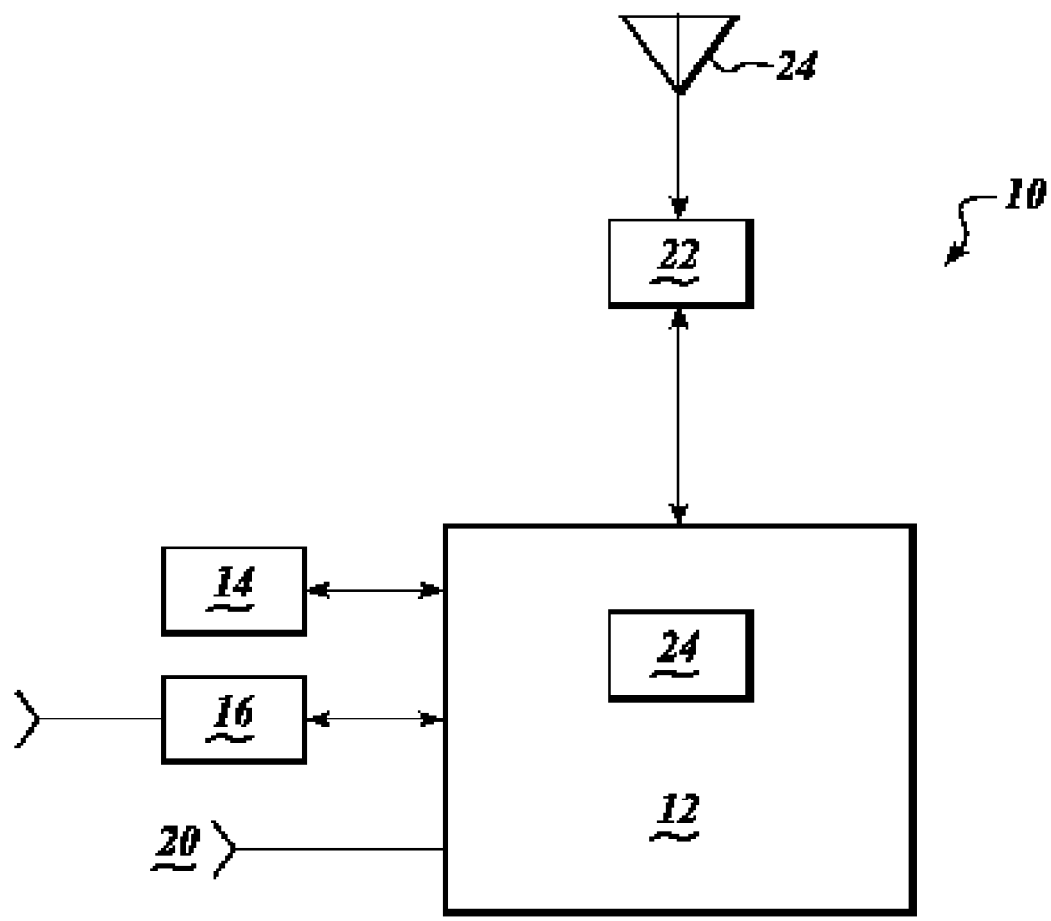
FIG. 1 is a block diagrammatic view of a communications system for an aircraft, according to an embodiment of the invention.

FIG. 1 is a block diagrammatic view of a communications system 10 for an aircraft, according to an embodiment of the invention. The system 10 includes a communication management unit (CMU) 12 that is configured to perform a variety of tasks related to communication management.

The CMU 12 is also coupled to a plurality of peripheral devices that cooperatively assist the CMU 12 in the performance of a variety of tasks. At least one monitoring and control display unit (MCDU) 14 is coupled to the CMU 12 that provides an alpha numeric keyboard that allows a flight crewmember to communicate commands to the CMU 12, and a display screen to view selected information generated by the CMU 12. A data base loader 16 is also coupled to the CMU 12 that is generally configured to permit ground personnel to provide updated information to the CMU 12, such as updated software or configuration databases. The CMU 12 permits a plurality of communications devices to be selectively coupled to a communications circuit 20 that permits audio and/or data signals to be communicated to the flight crew and other devices, respectively. For example, the communications devices may include a high frequency (HF) radio communications system, a satellite communications (SATCOM) system, or as shown in FIG. 1, a VHF radio communications system 22 that is further coupled to an antenna 24 that is typically positioned on an exterior portion of the aircraft. The VHF radio communications system 22 may include an acoustic coupler ("modem") that permits digital information to be communicated between the VHF system 22 and the CMU 12. Alternately, the acoustic coupler may be positioned in the CMU 12. Although the VHF radio communications system 22 is shown as a separate unit for purposes of illustration, it is understood that it may be coupled to the communications circuit 20.

With reference still to FIG. 1, the CMU 12 also includes a communications processor 24 that is operable to implement one or more logical rules that permit the system 10 to advantageously select a desired ground station. The logical rules may be incorporated into the system 10 as programmed instructions that are installed in the communications processor 24 through the data base loader 16, or alternately, as instructions that are "hard-wired" into the communications processor 24, or into other portions of the CMU 12. If the logical rules are implemented as programmed instructions, the rules may comprise a portion of an initial software installation of the system 10, or the programmed instructions may comprise a portion of a software revision that may be introduced into the system 10 through the data base loader 16. The logical rules will be described in greater detail below.

Figure 2:
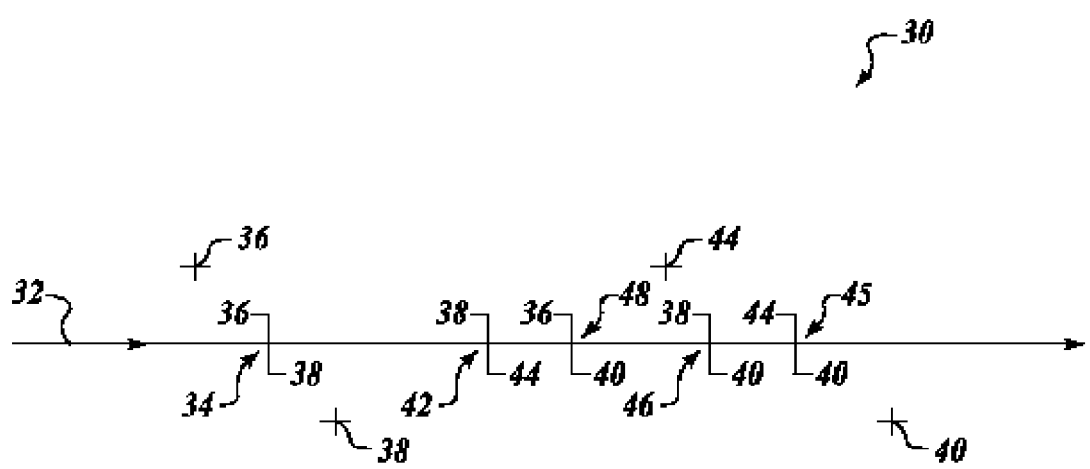
FIG. 2 is a plan view of a geographical area having a plurality of spaced-apart ground stations that is used to describe a method of communication between an aircraft and a ground station according to other embodiments of the invention.

FIG. 2 is a plan view of a geographical area 30 having a plurality of spaced-apart ground stations, which will be used to describe a method of communication between an aircraft and a ground station according to other embodiments of the invention. In some areas, such as major commercial airports, northeast US and central Europe, the geographical area covered by a ground station significantly (50% or more) overlaps the area covered by its neighbors. In general, an aircraft navigates along a flight route 32. As the aircraft proceeds along the route 32, communications occur between a plurality of ground stations on a common frequency. For example, when the aircraft is proximate to a ground station 36, the aircraft preferentially communicates with this station. As the aircraft moves away from ground station 36 and it proceeds along the route 32, the aircraft cease communications with the ground station 36, and initiates communications with the ground station 40 at a predetermined hand-over point 48. As previously described, the location of the hand-off point 48 is generally determined according to hand-off logic employed by the aircraft that selects a ground station based upon an assumed altitude for the aircraft. Provided that the aircraft is positioned at or above the assumed altitude, which may include altitudes at or above approximately about twenty-five thousand feet, the determination of the hand-over point based upon an assumed altitude generally provides a reliable communications link between the aircraft and the ground station. If, however, the aircraft is positioned at a lower altitude, it may be advantageous to discontinue communications with the ground station 36 and to initiate communications with the ground station 38 at the hand-over point 34 even though the signals from ground station 36 still have a high strength.

With continued reference to FIG. 2, as the aircraft navigates along the route 32 and away from the ground station 38, it discontinues communications with the ground station 38 and initiates communications with a ground station 40 after passing a hand-over point 46. If, however, the radio communications message traffic for other aircraft in that area is at or near the maximum capacity for the frequency channel, it may be desirable to initiate communications with the ground station 44 before reaching hand-over point 46 even though the aircraft is still receiving a strong signal from ground station 38 and the aircraft is within range of ground station 40. The reliability of line of sight communications varies with the amount of message traffic and distance between stations. When the aggregate message traffic is low then reliable communications can be achieved over longer distances and a hand-over from ground station to ground station 40 would provide acceptable performance at the lowest cost. When the aggregate message traffic is high then the same reliability level cannot be achieved over the same distance because of the impact of such well known affects as the "hidden transmitter". These affects reduce the reliability of communications when the aggregate message traffic is high. Thus, in order to maintain an acceptable reliability level it would be acceptable to in cur the cost of additional hand-overs and use ground station 44. In the present description, frequency channel occupancy is defined as the portion of the frequency channel traffic handling capacity in use at a given time, which may be conveniently expressed as a percentage of the maximum available traffic handling capacity of the frequency channel. Also based upon the traffic handling capacity of the frequency channel, it may be advantageous to initiate communications with a ground station 44 when the aircraft has reached the hand-over point 42. As the aircraft progresses still further along the route 32, the aircraft approaches a hand-over point 45 and based upon the available frequency channel traffic handling capacity in use at a given time, the aircraft may switch from the ground station 44 and communicate with the ground station 40.

Accordingly, in one embodiment, a logical rule for determining a hand-over point includes determining if the aircraft is above a reference altitude while maintaining communications with a first ground station, and determining if a measured signal strength from the first ground station is less than a reference signal strength value while the aircraft is above the reference altitude. If the foregoing logical conditions are satisfied, then the aircraft discontinues communications with the first ground station and initiates communications with a second ground communications station. If the conditions are not satisfied, the aircraft continues to communicate with the first station. As a result, the signal strength threshold is generally decreased as the altitude increases.

In another embodiment of the invention, a logical rule for determining a hand-over point includes determining a frequency channel occupancy for a selected frequency channel and determining if the frequency channel occupancy is greater than a reference value while maintaining communications with a first ground station, and determining if a measured signal strength from the first station is less than a reference signal strength value while the aircraft communicates with the first station. If the foregoing logical condition is satisfied, then the aircraft discontinues communications with the first ground station and initiates communications with a second ground communications station. If the conditions are not satisfied, the aircraft continues to communicate with the first station.

Figure 3:
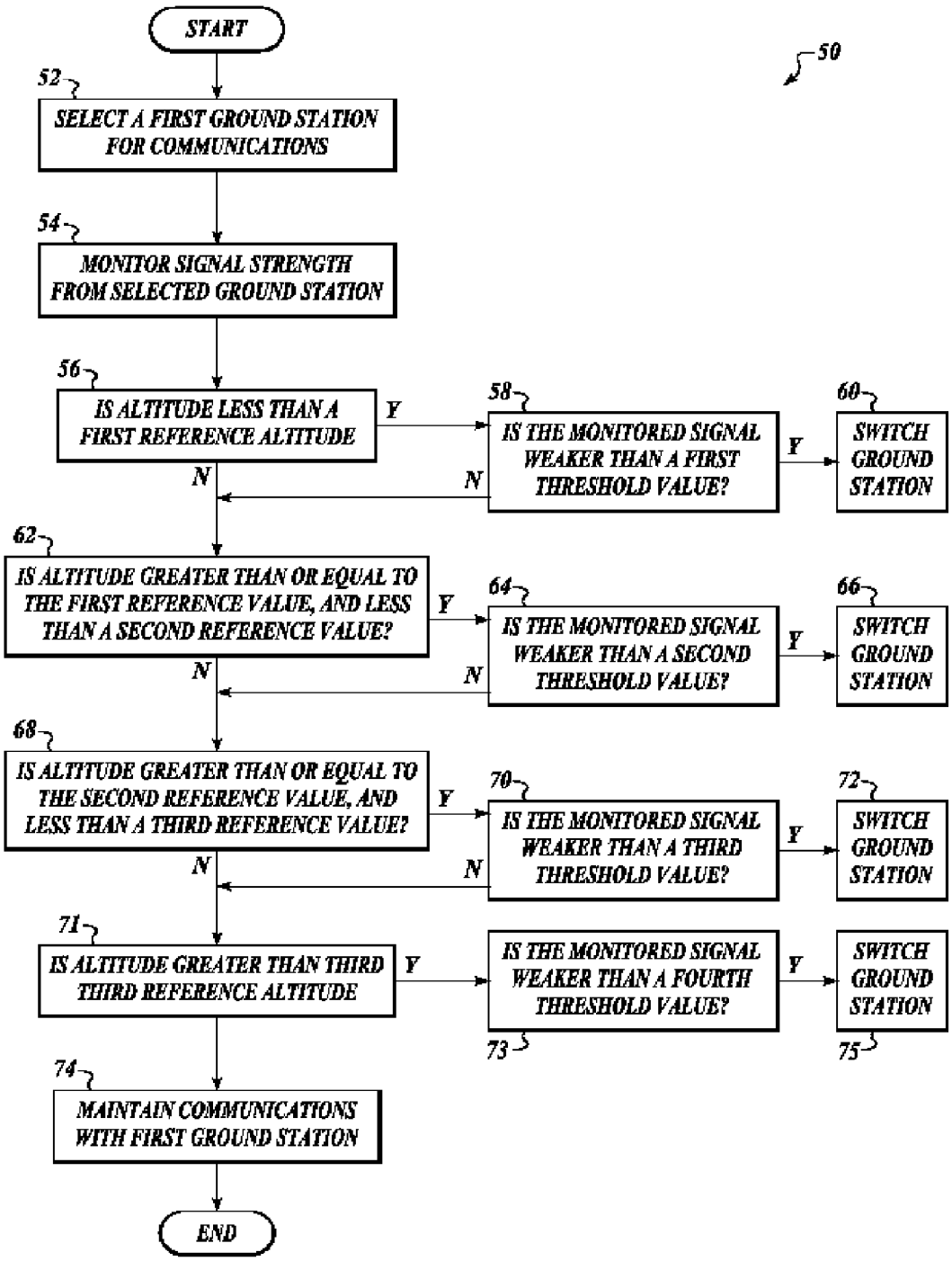
FIG. 3 is a block diagrammatic view of a method for selecting a ground station in an air-ground communications network, according to still another embodiment of the invention.

FIG. 3 is a block diagrammatic view of a method 50 for selecting a ground station in an air-ground communications network, according to still another embodiment of the invention. At block 52, an aircraft navigating along a selected route communicates with a first ground station using the system 10 of FIG. 1. While the aircraft is communicating with the first ground station, the aircraft monitors a signal strength of the selected ground station, as shown at block 54. At block 56, if the altitude of the aircraft is less than a first reference altitude, the method 50 moves to block 58. In a particular embodiment, the first reference altitude is approximately about five thousand feet. At block 58, if the monitored signal is weaker than a first threshold value, the aircraft switches to the second ground station, as shown at block 60. In a particular embodiment, the first threshold value is approximately about a signal level of five, relative to scale where a signal level of ten corresponds to a full scale response at the VHF radio communications system 22 of FIG. 1. Otherwise, if the conditions presented in block 56 and in block 58 are not met, the method 50 moves to block 62. At block 62, if the aircraft altitude is greater than or equal to the first reference altitude and less than a second reference altitude, the method 50 moves to block 64. In a particular embodiment, the second reference altitude is approximately about twelve thousand feet. At block 64, if the monitored signal is weaker than a second threshold value, the aircraft switches to the second ground station, at block 66. In a particular embodiment, the second threshold value is approximately about four. If the conditions at block 62 and at block 64 are not met, the method moves to block 68.

At block 68, if the aircraft altitude is greater than or equal to the second reference altitude and less than a third reference altitude, and if the monitored signal strength is weaker than a third threshold value, as shown at block 70, the aircraft switches to the second ground station, at block 72. In a particular embodiment, the third reference altitude is approximately about twenty four thousand feet. If neither of the conditions at block 68 and block 70 are met, the method 50 moves to block 71 and if the altitude is greater than the third reference altitude, the method 50 moves to block 73. If the monitored signal is weaker than a fourth threshold value, as shown in block 73, the aircraft switches ground stations, as shown in block 75. Otherwise, the method moves to block 74 and the VHF radio communications system 22 of FIG. 1 remains in communication with the first ground station.

Figure 4:
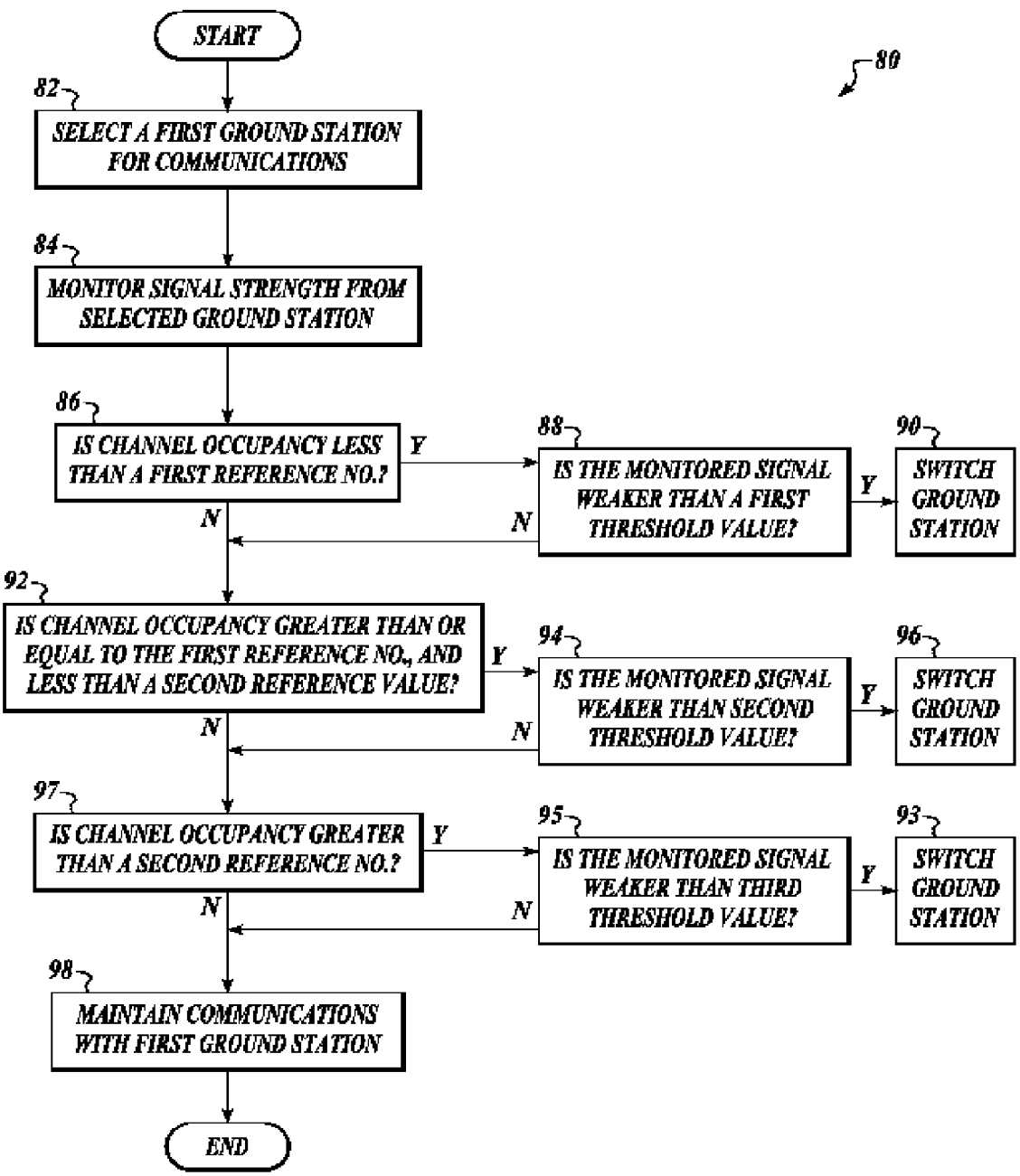
FIG. 4 is a block diagrammatic view of a method for selecting a ground station in an air-ground communications network, according to yet another embodiment of the invention.

FIG. 4 is a block diagrammatic view of a method 80 for selecting a ground station in an air-ground communications network, according to yet another embodiment of the invention. At block 82, an aircraft navigating along a selected route communicates with a first ground station using the system 10 of FIG. 1. While the aircraft is communicating with the first ground station, the aircraft monitors signal strength of a second ground station that is within a radio reception range of the aircraft, as shown at block 84. If a channel occupancy for the frequency is less than a first reference number, as shown at block 86, the method 80 moves to block 88. In a particular embodiment, the first reference number is approximately about 0.25, where 1.0 corresponds to a frequency channel that is handling radio communications at full capacity. At block 88, if the monitored signal of the selected ground station is weaker than a first threshold value, the aircraft switches to the second ground station, as shown at block 90. In a particular embodiment, the first threshold value is approximately about one. If neither of the conditions at block 86 and block 88 are met, the method 80 moves to block 92. At block 92, if the channel occupancy is greater than or equal to the first reference number, and less than a second reference number, the method 80 moves to block 94. In a particular embodiment, the second reference number is approximately about 0.50. At block 94, if the monitored signal of the selected ground station is weaker than a second threshold value, the method 80 moves to block 96, and the aircraft switches to the second ground station. In a particular embodiment, the second threshold value is approximately about two. Otherwise, if the conditions at block 92 and block 94 are not met, the method 80 moves to block 97. At block 97, if the channel occupancy is greater than the second reference number, the method 80 moves to block 95. If the monitored signal strength of the selected ground station is weaker than a third threshold value, the aircraft switches ground stations, as shown at block 93. Otherwise the aircraft maintains communications with the first ground station, as shown at block 98. In a particular embodiment, the third threshold value is approximately about three.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method of selecting a ground station in an air-ground communications network, comprising:
   initiating radio communications between an aircraft and a first ground station;
   determining an altitude of the aircraft while monitoring the signal strength value of the first ground station;
   comparing the altitude of the aircraft to a first reference value, a second reference value, and a third reference value; and
   discontinuing radio communications with the first ground station and initiating radio communications with a second ground station when the monitored signal strength of the first ground station is weaker than a threshold value associated with the reference value,
   wherein a first threshold value is associated with the first reference value, a second threshold value is associated with the first and second reference value, a third threshold value is associated with the second and third reference value, and a fourth threshold value is associated with the third reference value,
   wherein the third reference value is greater than the second reference value, which is greater than the first reference value, and
   wherein a fourth threshold value is less than the third threshold value, which is less than the second threshold value, which is less than the first threshold value.

2. The communication system of claim 1, wherein the
   first reference value is approximately five thousand feet;
   the second reference value is approximately twelve thousand feet;
   the third reference value is approximately twenty-four thousand feet;
   the first threshold value is approximately five relative to a full scale response of ten;

the second threshold value is approximately four relative to the full scale response of ten;

the third threshold value is approximately three relative to the full scale response of ten; and the fourth threshold value is approximately two relative to the full scale response of ten, wherein the full scale response of ten indicates a strong signal and a monitored signal strength value of zero indicates a weak signal.

3. A communications system for an aircraft, comprising:

a communications device operable to maintain bi-directional data communications between the aircraft and a selected ground communications station; and a communications processor coupled to the communications device that is configured to switch ground stations from a first ground station to a second ground station when one of the following occurs:
  a) a channel occupancy of the frequency channel shared by the ground stations is less than a first reference number and a monitored signal of the first ground station is weaker than a first threshold value;
  b) the channel occupancy of the frequency channel shared by the ground stations is greater than or equal to the first reference number and is less than a second reference number and the monitored signal of the first ground station is weaker than a second threshold value; and
  c) the channel occupancy of the frequency channel shared by the ground stations is greater than or equal to the second reference number and the monitored signal of the first ground station is weaker than a third threshold value, wherein the second reference number is greater than the first reference number, and wherein the third threshold value is greater than the second threshold value, which is greater than the first threshold value.

4. The communications system of claim 3, wherein the communications processor is further configured to maintain communications with a first ground station if the limitations of a), b), and c) are not met.

5. The communication system of claim 3, wherein the the first reference number is approximately 0.25 relative to 1.0 for full capacity;

the second reference number is approximately 0.50 relative to 1.0 for full capacity;

the first threshold value is approximately one relative to a full scale response of ten;

the second threshold value is approximately two relative to the full scale response of ten; and the third threshold value is approximately three relative to the full scale response of ten, wherein the full scale response of ten indicates a very strong signal and a monitored signal of zero indicates a very weak signal.

6. A method of selecting a ground station in an air-ground communications network, comprising:

initiating radio communications between an aircraft and a first ground station;

determining a channel occupancy of the frequency channel shared by the ground stations while determining a signal strength value of the first ground station;

comparing the channel occupancy of the frequency channel shared by the ground stations to a first reference number and a second reference number, until the channel occupancy of a frequency channel shared by the first ground stations is greater than one of the first reference number and the second reference number;

comparing the determined signal strength value of the first ground station to threshold values, wherein each threshold value is associated with at least one reference number, wherein a first threshold value is associated with the first reference number, a second threshold value is associated with both the first and second reference number, and a third threshold value is associated with the second reference number,
  wherein the second reference number is greater than the first reference number, and
  wherein the third threshold value is greater than the second threshold value, which is greater than the first threshold value; and discontinuing radio communications with the first ground station and initiating radio communications with a second ground station when one of the first reference number and the second reference number is greater than the channel occupancy of the first ground station and when the determined signal strength value is weaker than the associated threshold value.

7. The communication system of claim 6, wherein the
the first reference number is approximately 0.25 relative to 1.0 for full capacity;

the second reference number is approximately 0.50 relative to 1.0 for full capacity;

the first threshold value is approximately one relative to a full scale response of ten;

the second threshold value is approximately two relative to the full scale response of ten; and the third threshold value is approximately three relative to the full scale response of ten wherein the full scale response of ten indicates a strong signal and a determined signal strength of zero indicates a weak signal.

* * * * *